United States Patent [19]

Cunningham

[11] Patent Number: 5,100,450
[45] Date of Patent: Mar. 31, 1992

[54] METHOD AND APPARATUS FOR PRODUCING FIBERS

[75] Inventor: Douglas K. Cunningham, Savannah, Ga.

[73] Assignee: Manville Corporation, Denver, Colo.

[21] Appl. No.: 724,679

[22] Filed: Jul. 2, 1991

[51] Int. Cl.$^5$ .............................................. C03B 37/04
[52] U.S. Cl. .............................................. 65/6; 65/12; 65/14; 264/7; 264/8; 264/12; 425/8
[58] Field of Search .......... 65/6, 8, 12, 14, 15; 264/7, 8, 12; 425/8

[56] References Cited

U.S. PATENT DOCUMENTS

| | | | |
|---|---|---|---|
| 2,855,626 | 10/1958 | Firnhaber | 65/14 |
| 2,896,256 | 7/1959 | Firnhaber | 65/14 |
| 3,114,618 | 12/1963 | Levecque et al. | 65/14 |
| 3,179,507 | 4/1965 | Levecque et al. | 65/6 X |
| 3,347,648 | 10/1967 | Krakauer et al. | 65/6 X |
| 3,650,716 | 3/1972 | Brossard | 65/6 |
| 4,046,539 | 9/1977 | Pitt | 65/8 X |
| 4,277,436 | 7/1981 | Shah et al. | 65/8 X |
| 4,832,723 | 5/1989 | Shisler et al. | 65/6 X |

*Primary Examiner*—Robert L. Lindsay
*Attorney, Agent, or Firm*—John D. Lister; Cornelius P. Quinn

[57] ABSTRACT

A method and apparatus for expanding the fiber column produced by a rotary fiber glass manufacturing unit. A rotating bell-shaped shell is mounted beneath the rotary disc of the manufacturing unit so that the lower portion of the shell is in the path of the fiber column, causing the column to be outwardly deflected. Water is directed on the inner surface of the shell to cool the shell in order to prevent curing of binder which comes in contact with the shell, and binder is applied below the point of water application. If an amount of water in excess of the amount needed to cool the shell is provided it is thrown outward in the form of a spray which wets the fibers. The water spray also prevents fiber and binder from accumulating on the bottom edge of the shell.

22 Claims, 2 Drawing Sheets

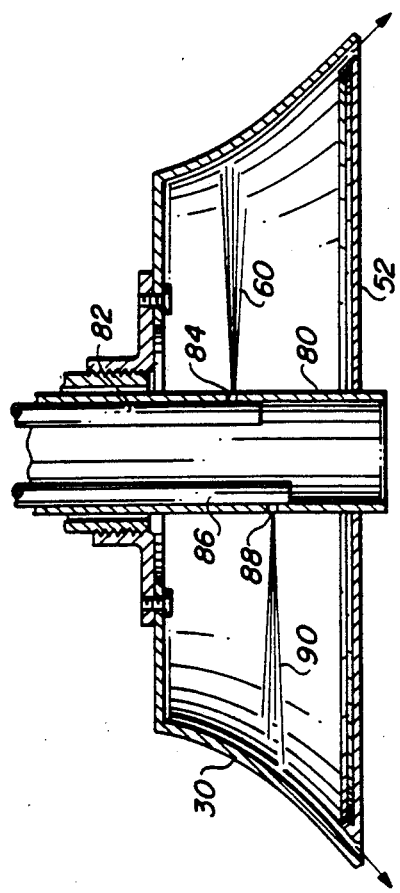
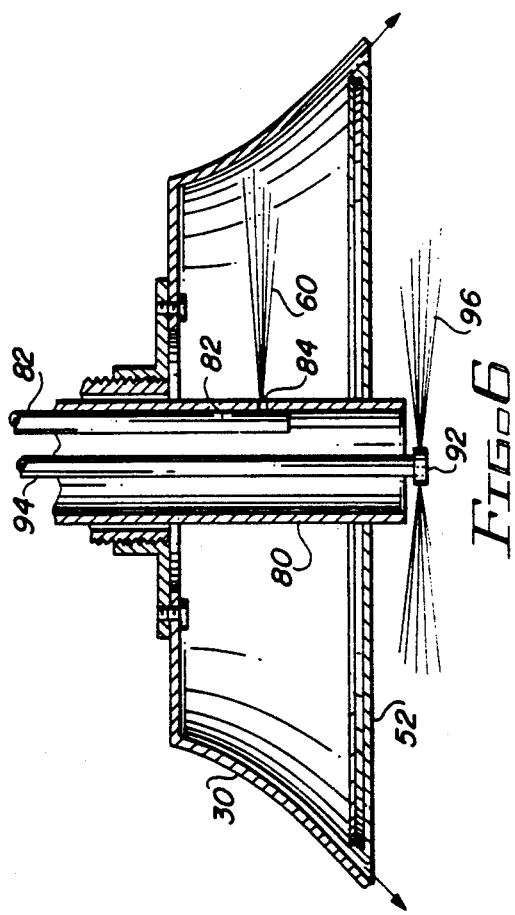
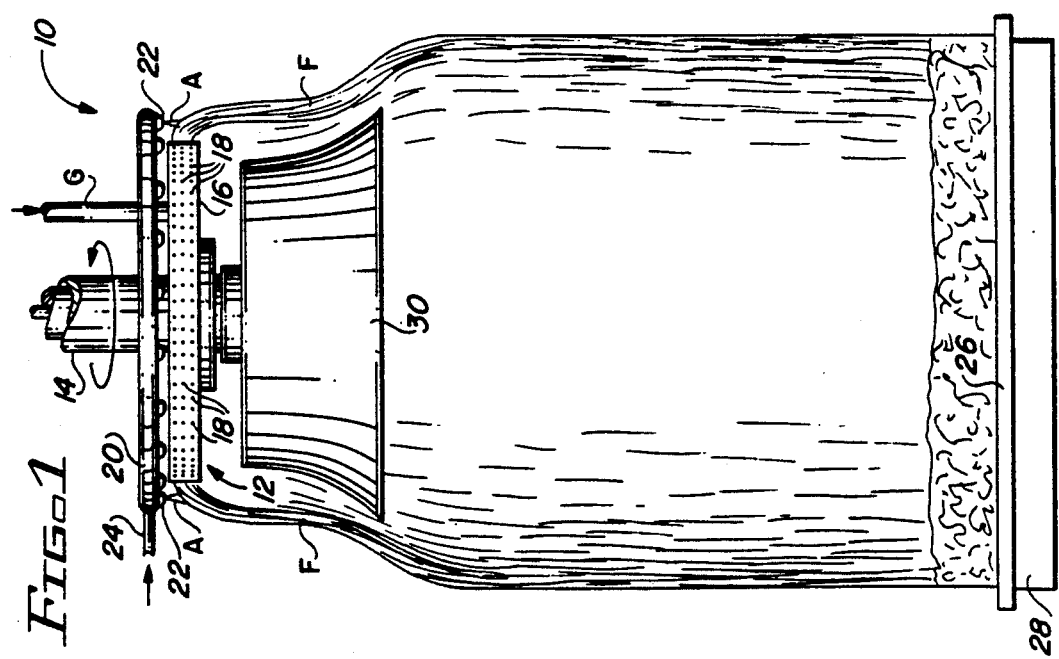

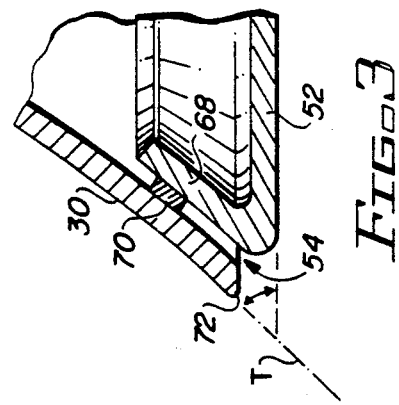
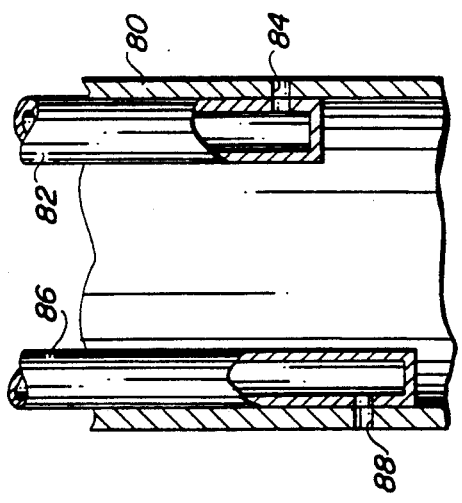
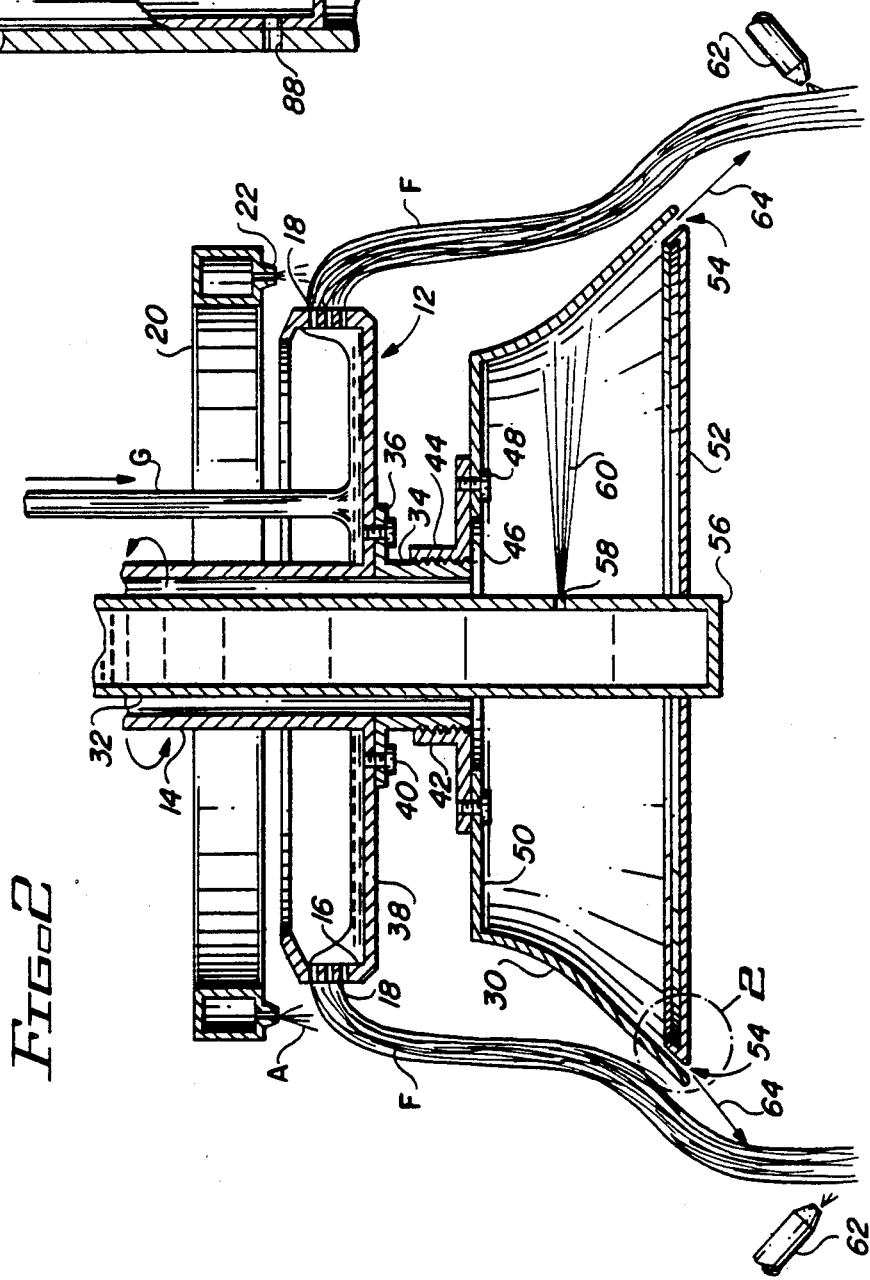

METHOD AND APPARATUS FOR PRODUCING FIBERS

FIELD OF THE INVENTION

This invention relates to the manufacture of fiber glass by a rotary or centrifugal process. More particularly, it relates to a method and means for controlling the flow of attenuated fiber glass from the spinner to a collection surface.

BACKGROUND OF THE INVENTION

The rotary process for producing glass fibers is well known. Basically, it involves delivering a stream of molten glass to a spinning rotor or disc and allowing centrifugal force to cause the glass to extrude through small orifices in the disc sidewall. The resulting fibers are further attenuated and directed downwardly toward a moving collection belt or chain by a blast of air from nozzles or orifices in an air ring surrounding the fiberizing disc. The column of falling fibers is then sprayed with binder which is later cured when the coated fibers are moved through an oven.

If the movement of the column of fibers is unaltered it converges at a point in its downward path to a minor diameter. The primary reason for this phenomenon is that the cylinder of high velocity air leaving the air ring orifices creates a low pressure zone beneath the spinner disc, and the pressure zones do not find equilibrium until they reach a point between the bottom of the spinner disc and the collection chain. The location of the minor diameter is affected by a number of factors, including the velocity of the air from the air ring and the static air pressure surrounding the column. The resulting well-defined relatively small column diameter permits precise deposition of glass fibers onto the collecting surface. On the other hand, it tends to facilitate the amassing of individual fibers into ropey bundles, resulting in many voids throughout the product due to poor fiber density distribution. Also, such a column has a high velocity which aggravates blowback around the collection chamber walls which in multi-spinner chambers can further deteriorate fiber density distribution. A product produced from such a blanket has less than optimal thermal insulating and tensile strength properties.

To provide for more uniform deposition of the fibers it has been suggested to control the path of the fiber column by a variety of different means. Obstacles have been positioned in the path of the column to redirect its flow, pulsating air streams have been used to control the column and the fiberizing equipment itself has been oscillated to distribute the fiber column across the collection chain. Although a number of these modifications have produced beneficial results in the area of fiber collection, they have not satisfactorily improved product quality to the desired level.

A significant remaining problem is the difficulty in uniformly coating the fibers with binder so as to produce a product with less variance in physical properties from one portion of the product to another. When spraying binder from a number of inwardly directed nozzles mounted circumferentially around the fiber column, it is difficult to avoid uneven binder application due to the tendency of the small orifices to occasionally clog. Moreover, it is difficult for such a spray to uniformly penetrate the dense fiber column, leaving some quantity of fiber devoid of binder. Further, the overlapping spray pattern of such an arrangement often results in binder adhering to the chamber walls. In addition, the nozzles and support headers sometimes trap fibers which accumulate into wads before eventually being dislodged and deposited in the fiber blanket.

It has been suggested to introduce binder from within the fiber column while at the same time distorting the shape of the column by pressurized air, also delivered from within the column. The density distribution of the fibers can be improved by changing the shape of the column in this manner, and this method of applying binder results in better binder distribution and permits the use of a larger nozzle orifice, which reduces the tendency to plug. An example of such an arrangement is disclosed in U.S. Pat. No. 4,832,723, wherein the air and binder are shown as being applied through centrally mounted tubes extending below the rotary disc. Although this method is an improvement over previous methods of applying binder and controlling the shape of the fiber column, certain aspects of the method still leave room for improvement. The build-up of fibers and binder on the nozzle end cannot always be entirely eliminated, and the effect of the air blast on the shape of the fiber column can be less than desired when utilized in connection with large size discs.

It would be desirable to provide a method and means for better controlling the shape of the fiber column during production of fiber glass by the rotary process. It would also be desirable to improve the binder application method in conjunction with controlling the shape of the fiber column so that binder can be more uniformly applied to the fibers. Preferably, the binder application method would be suited for use with large diameter discs and would be capable of applying binder from within the column without permitting significant fiber and binder to build up on the binder spray nozzle.

SUMMARY OF THE INVENTION

In accordance with the invention, a shell in the shape of a body of revolution is mounted beneath the fiberizing disc of a rotary fiber manufacturing unit for rotation therewith. The lower portion of the shell has a greater diameter than the upper portion of the shell and is positioned in the path of movement of the fiber column. The rotating shell, interacting with fiber attenuation forces, causes the fiber column to expand radially outwardly without fibers building up on the shell outer surface. In addition, water is introduced to the inner surface of the shell to cool the bell material, thereby preventing binder in the ambient atmosphere surrounding the shell from adhering, curing and accumulating on the hot shell. If additional volumes of water are added beyond the amount needed to cool the shell, the excess is thrown from the lower end of the shell by centrifugal force into contact with the fiber column. By applying binder at a point in the fiber column below the point where water is applied, adherence of the binder to the fibers is improved. In addition, the water prevents build-up of fibers and binder on the bottom of the shell.

Binder may be applied by various means, such as by directing it against the inside surface of the rotating shell to allow centrifugal force to throw it out from the bottom of the shell, by spraying it from a centrally disposed nozzle, or by the more conventional method of spraying it on the fibers from points spaced outwardly of the fiber column. In any case, the binder is applied at a point below the point of application of the cooling water.

Preferably, the shell is provided with a bottom plate, and the water can be thrown outwardly through openings adjacent the connection between the bottom plate and the shell. Both the water and binder preferably are introduced through separate tubes extending through a hollow shaft which rotates the disc. The shell is generally frusto-conical in shape and preferably substantially bell-shaped.

The invention is particularly applicable to the rotary process for fiberizing molten glass, and results in a number of benefits. By providing an enlarged pattern of distribution on the collection chain, the density distribution of the fibers and the thermal performance of the resulting product can be improved. The water spray cools and conditions the fiber glass, resulting in benefits to the process described in more detail below. Further, the manner in which the water spray is generated also allows the use of a larger size water orifice which does not tend to get clogged by impurities in the water.

BRIEF DESCRIPTION OF THE DRAWINGS

FIG. 1 is a side elevation of apparatus employed in a rotary fiber glass production facility which incorporates the basic features of the invention;

FIG. 2 is an enlarged vertical sectional view of the apparatus of FIG. 1;

FIG. 3 is an enlarged partial sectional view showing the area within the circle 2 of FIG. 2 in greater detail;

FIG. 4 is a vertical sectional view of the bell portion of the apparatus, illustrating a modified arrangement for applying binder;

FIG. 5 is an enlarged partial vertical sectional view of the water and binder spraying means of FIG. 4; and FIG. 6 is a vertical sectional view of the bell portion of the apparatus similar to the view of FIG. 4, illustrating a further modified arrangement for applying binder.

DETAILED DESCRIPTION OF THE PREFERRED EMBODIMENT

Referring to FIG. 1, a rotary spinner assembly 10 is comprised of a disc or spinner 12 connected to a rotating shaft 14. The disc includes a sidewall 16 which contains a myriad of small holes 18. The upper end of the disc is open to the continuous flow of molten glass G, which is moved by the centrifugal force created by the spinning disc toward the sidewall and extruded through the openings 18. Normally, heating means, not shown, are provided in close proximity to the interior and exterior of the disc for the purpose of maintaining the molten glass and the disc in the desired temperature range. Mounted above and radially outwardly of the disc 12 is a hollow ring 20 containing a number of spaced orifices 22. Air under pressure is supplied to the ring through an inlet 24 and leaves the orifices to form a cylinder of air A. Upon striking the fibers F exiting from the spinner holes 18, the air further attenuates them and directs them down toward a moving collection chain 26. A suction box 28 is shown directly beneath the chain to cause the fibers to better adhere to and collect on the chain. The structure described thus far is well known in the art.

Still referring to FIG. 1, in accordance with the invention, a shell in the shape of a truncated body of revolution 30 is mounted so as to rotate with the disc 12. The body of revolution illustrated has a minor diameter at its upper end and a major diameter at its lower end so as to have a generally downward and outward taper. The body of revolution has an increasingly greater diameter as it approaches the major diameter end to form a frusto-conical configuration, and preferably to form the illustrated bell-shaped body positioned so that the lower portion of the body intercepts fibers moving down from the disc toward the collection surface.

The arrangement described above is shown in more detail in FIG. 2, wherein the rotating shaft 14 is seen to be hollow, with a stationary tube 32 extending through it. A clamping hub 34 having a flange 36 at its upper end is attached to the bottom plate 38 of the disc 12 by bolts 40 which extend through the flange 36. Attached to the lower end of the hub 34 by any suitable means such as screw threads 42 is a short hub member 44 which is connected to plate 46. The bell-shaped body 30 is attached to the outer periphery of the plate 46 by circumferentially spaced bolts 48 which extend through a radially inwardly directed lip 50 of the bell. A bottom plate 52 containing a central aperture through which the tube 32 extends is connected to the bottom peripheral edge portion of the bell sidewall so as to leave a small gap 54 between the sidewall and the plate. The tube 32 is closed at its lower end by cap 56, and further contains an opening 58 at a point within the body 30.

In operation, the shaft 14 is caused to rotate at very rapid speeds, as is well known in the art, causing the attached disc 12 to rotate with it. The fibers F exiting the orifices 18 in the disc form a cylindrical sheath or column moving in a generally downward direction as shown. The column is directed radially outwardly by the interaction of the rotating bell-shaped body 30 with fiber attentuating forces, after which it continues its downward path, now at a greater dispersed diameter than it would have been if the column had not been intercepted by the bell.

At the same time, water supplied to the tube 32 under pressure is dispersed in a stream through the opening 58 as indicated by the water stream 60. The water strikes the inner surface of the rotating bell 30 which causes the water to form steam and cool the bell material. If the bell were not cooled, ambient binder originating from binder spray nozzles, such as, for example, the nozzles 62 illustrated as surrounding the fiber column, would cure to the bell surface and gradually cause fiber to adhere to the bell. The resulting fiber clusters would eventually release and be thrown into the product. It is not practical to cool the bell by spraying water on the external surface of the bell because the water would interfere with the attenuation and flow of the fibers. Although only a single opening 58 in the tube 32 is needed, since the entire circumference of the bell is contacted by water as a result of centrifugal action, it will be understood that one or more additional holes may be provided in the tube 32 if desired.

This operation results in a number of benefits. The fiber column conforms to the shape of the outer surface of the body 30, which causes the column to exit the body with a radial component of movement. Thus the column is radially expanded to a degree which can be controlled by varying the angle of the bottom lip of the bell surface in harmony with the attenuating force used at that time. This expansion reduces ropey fiber bundles in the column and the resulting ropey networking in the formed blanket, and provides an enlarged pattern of distribution on the collection chain, resulting in improved density distribution of the fibers. While the enlarged pattern of distribution is important at all line speeds, it becomes critical at elevated line speeds and low weight products. Further, the improved density distribution improves thermal performance yield in the resulting product. The expansion is efficiently accomplished by introducing this bell shape into the attenuating forces, so the cost of new energy sources is avoided, thereby permitting lower energy costs compared to prior art expansion methods which require the use of pressurized air.

It will be understood that for any given temperature of the bell surface, the heat transferred to the cooling water is capable of causing a certain volume of the water to turn to steam. If the volume of water sprayed on the bell exceeds the amount that turns to steam, the excess water is atomized and tangentially dispensed as a spray from the interior of the rotating bell through the gap 54, as indicated by the flow arrows 64. The water spray contacts the fiber, cooling it and also reducing the temperature of the surrounding atmosphere, which if too hot can be detrimental to binder application. It will be understood that the amount of water added will vary depending on conditions and on the amount of water that is introduced into the process by other means, such as through inclusion in the binder mixture.

The water spray cools and conditions the fiber glass and ambient atmosphere. It is extremely uniform, efficiently coating the fibers at close range, thereby substantially eliminating dead spots in the spraying operation and avoiding the use of bulky nozzles which can trap fiber and create wet wads of fiber in the product. The sprayed fibers are therefore relatively cool and moist at the point of binder application, which results in increased binder flow on the individual fibers. Greater binder efficiencies are also realized due to the reduction of binder losses from flashing at high temperatures, which is more commonly experienced in processes that do not water-spray the fibers.

If the bell-shaped body were not provided with the bottom plate 58, fiber and binder would tend to migrate up inside the bell, accumulating there and also possibly protruding out past the bottom lip of the bell. Because this would tend to catch and sling fibers into the column, it would interfere with the uniform coating and deposition of fibers. The bottom plate prevents fiber and binder from accumulating on the bottom rotating surface of the bell. It does not, however, prevent fiber and binder build-up on the inside edge of the bottom bell lip. To prevent this from occurring and to ensure that a desired supply of water spray is emitted from the rotating bell, the arrangement of FIG. 3 may be used, wherein the bottom plate 52 is rolled back to form a lip 68. The lip is spaced from the sidewall of the bell-shaped body 30 by shims 70, which are spaced about the periphery of the unit. The bottom plate 52 can be attached to the sidewall by welding the shims to both the bottom plate and the sidewall. Preferably, the bottom plate 52 is located so that the bottom surface is below the end 72 of the bell sidewall, thereby helping to shield the interior surface of the bell sidewall from fiber and binder traveling across the bottom surface of the plate.

The sharp bell lip or edge design reduces the surface area on which fiber could build up. It also allows water distributed around the bell from the outlet 58 to exit the bell tangentially through the gap 54. This provides a constant uniform flush which cleans the lip of most contamination. The width of the gap is controlled by the thickness of the shims 70, and may be altered according to the operating conditions of the rotary process operation. A typical gap dimension may be about ⅛ inch.

By altering the angle between the bottom plate 52 and the tangent of the radius of the curved lip or end portion of the bell sidewall, indicated in FIG. 3 by the dotted line T, the amount that the column of fiber is expanded can be controlled. The smaller the angle, the greater the horizontal deflection will be and the more the column will be expanded. On the other hand, the smaller the angle the more difficult it is to attach the bottom plate to the bell and the more the fibers are affected by impinging on the bell surface. It is not necessarily desirable to obtain the largest column possible because a larger column is more difficult to control and makes it more difficult to uniformly apply binder to the fibers. Although the precise angle employed is best determined from empirical studies, it is preferred that the angle be in the range of 45° to 60°.

By employing a water spray which is not dependent upon the size of a nozzle orifice for its creation, the aperture 58 in the tube 32 can be made sufficiently large so as to mitigate against clogging. This makes possible the use of water containing material which otherwise would tend to clog a smaller nozzle opening. The use of recycled water from the operation is thus facilitated with little danger of contaminants in the water clogging the opening.

The invention has been described thus far in connection with the application of binder from inwardly directed nozzles located outside the fiber column. The invention is particularly adaptable, however, to the application of binder from within the column which in most cases is preferred as a more efficient method of application. This can be accomplished by the arrangement shown in FIG. 4, wherein a stationary tube 80 extends down beyond the lower plate 52 as in the case of tube 32 of FIG. 2, but does not have an end cap for retaining water in the tube. Instead, a separate smaller diameter tube 82 is provided adjacent the inner surface of the tube 80 through which water is supplied. As shown in FIG. 5, the lower end of the tube 82 is closed and an orifice 84 extending through both the tubes 80 and 82 allows a jet of water 60 to be sprayed against the inner surface of the rotating bell 30. On the other side of the tube 80 another closed-end tube 86 is provided adjacent the inner surface of the tube 80. As shown in FIG. 5, an orifice 88 extending through both the tubes 80 and 86 is located at a point lower than the orifice 84. Binder supplied under pressure to the tube 86 sprays out through the orifice 88 in a stream 90 and strikes the inner surface of the rotating bell at a point below the bell surface contacted by the water spray. It must contact the water cooled surface of the bell to avoid curing to the bell surface. The binder may be introduced in this manner regardless of whether excess water is introduced or only enough water is introduced to cool the bell as discussed above. If excess water is present, a mixture of water and binder will be sprayed from the bottom edge of the bell outwardly toward the fiber column, achieving the same benefits discussed in connection with water treated fibers which are coated with binder from nozzles located outside the fiber column. It will be understood that this internal method of spraying binder can be used either alone or in conjunction with external binder nozzles.

The tubes 82 and 86 may be fixed in place by any suitable means, such as by being welded to the tube 80, and the orifices 84 and 88 may be formed after the tubes 82 and 86 have been installed by drilling through the walls of the tube 80 and the adjacent walls of the tubes 82 and 86.

Another arrangement for applying binder to the fibers is illustrated in FIG. 6, wherein water is sprayed against the bell surface in the same manner as in the FIG. 4 arrangement. Instead of a binder spray directed against the bell surface, however, it is sprayed from a nozzle 92 attached to the lower end of a binder tube 94 which extends through the hollow tube 80. The nozzle preferably is capable of spraying a 360° fan of binder 96 outwardly toward the fiber column so as to coat the falling fibers. As in the case of the FIG. 4 embodiment, excess water may be provided to cool the fibers to prepare them for binder application. As in the previous case, binder may be applied by more than one means. Thus, binder could additionally be applied by external nozzles or by the method illustrated in FIG. 4, or by both.

It will be understood that the water introduction arrangement of FIG. 4 can be used instead of the arrangement of FIG. 2 even when binder is not supplied by either of the methods illustrated in FIGS. 4 and 6.

Although the illustrated body of revolution is bell shaped, it will be understood that other shapes may work satisfactorily in some installations so long as they are able to guide the fiber column radially outwardly and can be provided with a peripheral gap or opening through which water spray can exit. A bell-shaped body is preferred, however, because the fibers are thereby progressively diverted from their normal path, thus requiring less working height than possibly a conical shape.

The body of revolution is preferably formed of a sheet metal which can readily form into the desired shape, as by roll or spin forming. The cost of the body is also minimized when sheet metal, for example, 16 gage, is used. Stainless type material can be employed if desired.

It should now be apparent that a number of benefits flow from the invention. As a result of inexpensive modifications to conventional rotary fiber manufacturing equipment, the column of fiber is efficiently expanded, fiber and binder build-up on the equipment is minimized or eliminated, the fibers are water treated before being sprayed with binder and the final product has better and more uniform physical and thermal properties.

It will be appreciated after reading the foregoing description that the invention need not necessarily be limited to all the specific details described in connection with the preferred embodiment, but that changes to certain features which do not alter the overall basic function and concept of the invention may be made without departing from the spirit and scope of the invention defined in the appended claims.

What is claimed is:

1. In apparatus for manufacturing fibers by a rotary process, wherein molten material capable of being fiberized is delivered to a rotating disc having a sidewall containing a plurality of fiberizing openings, the apparatus including means for impacting fibers extruded from the holes with a gaseous stream to form a column of downwardly moving fibers and means for applying binder to the fibers, the improvement comprising:
   a shell in the shape of a body of revolution mounted beneath the disc for rotation therewith;
   the shell having an upper portion, a lower portion, an outer surface and an inner surface;
   the lower portion of the shell having a greater diameter than the upper portion and being positioned in the path of movement of the fiber column whereby the fiber column is expanded radially outwardly; and
   means for directing water against the inner surface of the shell to cool the shell, whereby binder contacting the shell is prevented from curing.

2. The apparatus of claim 1, wherein the shell is shaped so that water in excess of the amount required to cool the shell flows down the inner surface of the shell and is thrown outwardly from the bottom of the shell by the centrifugal force of the rotating shell.

3. The apparatus of claim 2, including a bottom plate, means connecting the bottom plate to the shell so as to provide openings adjacent the bottom plate and the shell through which the water can be thrown.

4. The apparatus of claim 3, wherein the openings adjacent the connection between the bottom plate and the shell comprise spaces between the shell and the bottom plate.

5. The apparatus of claim 4, wherein the bottom plate is lower than the lowermost point on the shell.

6. The apparatus of claim 4, wherein the bottom plate forms an angle with a tangent to the lower portion of the shell in the range of 45° to 60°.

7. The apparatus of claim 4, wherein the spaces between the shell and the bottom plate are formed by a circumferential edge portion on the bottom plate spaced from and substantially parallel to the adjacent lower portion of the shell, the connection between the bottom plate and the shell being at spaced points along the circumferential edge portion of the plate.

8. The apparatus of claim 1, wherein the disc is connected to a rotating hollow shaft, and wherein the means for introducing water to the inside surface of the shell comprises a tube extending through the hollow shaft, the tube having at least one opening therein through which water can flow.

9. The apparatus of claim 8, including a second tube extending through the hollow shaft, and means for spraying binder from the second tube at a point below the water spray opening in the first-mentioned tube.

10. The apparatus of claim 9, wherein the means for spraying binder from the second tube is located within the shell and directs binder against the inner surface of the rotating shell.

11. The apparatus of claim 9, wherein the means for spraying binder from the second tube comprises a spray nozzle located below the shell substantially centrally of the hollow shaft.

12. The apparatus of claim wherein the shell is generally frusto-conical in shape.

13. The apparatus of claim 12, wherein the shell is substantially bell-shaped.

14. The apparatus of claim 1, wherein the apparatus is capable of fiberizing molten glass.

15. In a method for manufacturing fibers by a rotary process, wherein molten material capable of being fiberized is delivered to a rotating disc having a sidewall containing a plurality of fiberizing openings, a gaseous stream impacts fibers extruded from the holes to form a column of downwardly moving fibers, and binder is applied to the fibers, the improvement comprising:
   providing a shell in the shape of a body of revolution, the shell having an upper portion, a lower portion, an outer surface and an inner surface, the lower portion of the shell having a greater diameter than the upper portion;

positioning the shell beneath the disc so that the lower portion thereof is in the path of movement of the fiber column to radially expand the fiber column; and directing water against the inner surface of the shell to cool the shell, whereby binder contacting the shell is prevented from curing.

16. The method of claim 15, including the step of rotating the shell about the axis of the body of revolution, and wherein water in excess of the amount which turns to steam as a result of cooling the shell flows down the inner surface of the shell and is thrown outwardly against the falling fibers from the bottom of the shell by the centrifugal force of the rotating shell.

17. The method of claim 16, wherein the binder is applied to the fibers by directing a stream of binder against the inner surface of the rotating shell, the binder flowing down the inner surface of the shell and being thrown against the falling fibers from the bottom of the shell by the centrifugal force of the rotating shell.

18. The method of claim 16, wherein the binder is applied to the fibers by directing a binder spray generally radially outwardly from a point below the shell.

19. The method of claim 16, wherein fiber and binder are prevented from accumulating on the bottom rotating surface of the shell by a bottom plate attached to the shell and by the outwardly thrown excess water.

20. The method of claim 15, wherein the molten material being fiberized is molten glass.

21. The method of claim 15, wherein the shell is generally frusto-conical in shape.

22. The method of claim 21, wherein the shell is substantially bell-shaped.

* * * * *